US007853538B2

(12) United States Patent
Hildebrand

(10) Patent No.: US 7,853,538 B2
(45) Date of Patent: Dec. 14, 2010

(54) FUZZY LOGIC-BASED SURVEILLANCE IN INFORMATION TECHNOLOGY AND BUSINESS SERVICE MANAGEMENT SYSTEMS

(76) Inventor: Dietmar Hildebrand, Qatar Office SMC 1070, 5032 Forbes Ave., Pittsburgh, PA (US) 15289

( * ) Notice: Subject to any disclaimer, the term of this patent is extended or adjusted under 35 U.S.C. 154(b) by 961 days.

(21) Appl. No.: 11/679,542

(22) Filed: Feb. 27, 2007

(65) Prior Publication Data

US 2008/0034313 A1    Feb. 7, 2008

Related U.S. Application Data

(60) Provisional application No. 60/790,669, filed on Apr. 10, 2006.

(51) Int. Cl.
*G06F 15/18* (2006.01)
(52) U.S. Cl. .......................................................... 706/1
(58) Field of Classification Search ...................... 706/1
See application file for complete search history.

(56) References Cited

U.S. PATENT DOCUMENTS

| 6,112,301 | A | 8/2000 | Johnson | |
| 6,525,754 | B2 * | 2/2003 | Landolt | 347/139 |
| 6,584,502 | B1 | 6/2003 | Natarajan et al. | |
| 6,845,336 | B2 * | 1/2005 | Kodukula et al. | 702/118 |
| 6,990,474 | B2 * | 1/2006 | Woods et al. | 706/1 |
| 6,993,681 | B2 * | 1/2006 | Haynes et al. | 714/23 |
| 2004/0225587 | A1 * | 11/2004 | Messmer et al. | 705/35 |

OTHER PUBLICATIONS

Michael Morrison, "The Complete Idiots Guide to Java 2", 1999, pp. 136-138.*
John J. Bartholdi, III, "Elevator control panels", archived copy available at: http://web.archive.org/web/20040323152303/http://www.isye.gatech.edu/~jjb/misc/elevators/elevators.html, available since at least Mar. 23, 2004, accessed Mar. 15, 2010.*

* cited by examiner

*Primary Examiner*—Michael B. Holmes
*Assistant Examiner*—Vincent M Gonzales
(74) *Attorney, Agent, or Firm*—Fox Rothschild LLP; Dennis M. Carleton

(57) ABSTRACT

A method and apparatus are disclosed for monitoring all levels of information technology and computing resources from low-level hardware up to enterprise level applications and their relation to business processes and business services, and alerting responsible personnel by giving them decision support by visual feedback using color cross-fading graphical objects showing parameter status and monitored resource status multi-colored by a scheme, which is determined by applying fuzzy logic to the raw monitored indicator parameter values and derived or propagated status attributes and by triggering events derived from fuzzy logic based analysis of raw measured parameter values and derived or propagated status attributes and raw events raised outside the apparatus.

24 Claims, 12 Drawing Sheets

FUZZY LOGIC-BASED SURVEILLANCE IN INFORMATION TECHNOLOGY AND BUSINESS SERVICE MANAGEMENT SYSTEMS

RELATED APPLICATIONS

This application claims the benefit of U.S. Provisional Application Ser. No. 60/790,669, filed Apr. 10, 2006.

FIELD OF THE INVENTION

This invention relates generally to computer networks. The invention relates to a method and apparatus for centrally monitoring and managing the computers, applications and other resources present in a distributed computing environment. More specifically the invention relates to a method and apparatus providing visual decision support for
a) the management of the business processes conducted using the computers, applications and other resources; and
b) the management of the resources themselves.

TERMINOLOGY

Computer Science and the IT industry have a long history of using words of the ordinary language in a field specific definition. This usage sometimes collides with also specific definitions in other sciences and fields of engineering. This document uses all terms as defined or used in computer science and IT industry, unless more specifically defined within this document.

The term "parameter" is used to denote one dimension in the multidimensional vector space determining the health and performance of a business process or the underlying computing resource, such as an application program, a database, a networking software, an operating system or components of the underlying hardware.

The term "resource" is used to describe one or a group of entities in the hierarchy (business process, application program, database, networking software, operating system, hardware).

The term "status" is explained explicitly in the detailed description of the invention to mean a health status, performance status, discovery status, automaton status, advice status, higher level status, or other form of state information derived via Boolean logic, fuzzy logic or by other forms of reasoning.

BACKGROUND OF THE INVENTION

Performing surveillance and monitoring status and performance parameters of IT (information technology) systems may be accomplished via any one or more of a number of methods, which are well known in the art.

In one method, software agents may be used. A software agent executes code, which determines the value of a parameter (for example, the percentage of CPU power used) based on a timer or based on a request received by the agent, and reports it to a remote server or console. A remote intelligence, which is either the console itself or a server between the console and the agent, receives and displays the value of the parameter. The intelligence may also perform threshold processing to determine, if the value indicates a status change of the monitored resource. An example of this scheme using the standardized Simple Network Management Protocol (SNMP) is shown in FIG. 1.

A software agent as described above may have the capability of performing threshold processing locally to determine whether or not a new value indicates a change in status of the monitored resource, and can send a message to a remote console or server to trigger further processing, such as displaying the message or storing the message. If such a message is related to the status of a business process, which requires the monitored resource, rules may be evaluated to determine the appropriate actions to be taken. An example of this variation using SNMP is shown in FIG. 2.

In another method of monitoring known in the prior art, the operating system or an application can be remotely queried using a standard protocol or a proprietary protocol to obtain parameter values, which may be obtained based on a timer or measured on request. A remote intelligence, which is either the console itself or a server between the console and the monitored resource, receives the value, displays the value, or determines, if the value indicates a status change of the monitored resource. An example of this method using Microsoft's WMI is shown in FIG. 3.

The methods mentioned above can use standard protocols, such as SNMP, or can be implemented using proprietary communication protocols. Such proprietary protocols may be found in the prior art in products such as HP's OpenView, BMC Patrol, CA Unicenter, etc.

Current IT monitoring systems raise "events" or "alerts" based on observations at the monitored resource or measurements of parameter values at the monitored resource. An example of such observations may be the presence of all required files and processes of a running software application. Likewise, examples of a measurement of a parameter value may be the temperature of the CPU chip or the cache hit rates of a database engine.

Based on observations and measurements, a "status" may be determined for each parameter, each instance of the monitored resource, the whole class of monitored resources or the overall IT-system containing the monitored resources. The health and performance of business processes can then be derived from the known alerts on those IT resources, which are required for the particular business process.

Current IT monitoring systems use the principle of thresholds defined for monitored parameter values, also called parameters or variables (SNMP) and Boolean Logic to determine the status of a monitored resource or, if an alert should be raised. See, for example, U.S. Pat. No. 5,655,081. Using thresholds and Boolean Logic may lead to results, which differ from conclusions, which may be drawn using the normal ways of human reasoning.

For example, if the percentage of used bytes on a storage device is monitored and a threshold is defined at 70%, then a conventional monitoring console will show an OK-status when the percentage of used bytes is at 69.99%. When on the next sampling interval the percentage of used bytes goes to 70.01%, the monitoring console will show a not-OK-status for the monitored resource. Additionally, traditional methods allowing decision making close to the source, such as using some form of agent as described above, may send and store event records for notifying remote consoles or servers for logging and secondary notifications.

Therefore, under prior art methods and systems, a value of 69.99% will go unnoticed, while a value of 70.01%, which just exceeds the threshold, may cause one or more reactions coupled to the raised event, such as an incident record being created, reported and stored in the central management database (CMDB). As a result, problem analysis will be started and, depending on the degree of automation, a number of personnel will have to look at the situation, make some judgment about it and initiate remedial action, because the situation is perceived as alert situation.

The value in the given example actually has changed only by less than 1 per mille. Normal human reasoning would likely dictate that no action be taken in response to such a miniscule change, but that the parameter be watched to see if a trend is developing, which may eventually fill the storage device, in which case remedial action may need to be taken to prevent the problem.

An example of Boolean logic potentially leading to overreaction can be illustrated in application monitoring, where one of the above mentioned methods known in prior art might trigger an alert based on the existence or not-existence of a running process. It is likely that only at very high levels of reasoning about the business process it is possible to determine if this operating system level process is critical to the business process or not. If this process was one of many work processes inside a multi-process application, then in many cases the application will recover from the situation by restarting the process or it may even be that the application had terminated the process deliberately and does not want it to be restarted.

If intelligence more like human reasoning could be applied at the source of the alert instead of simple Boolean logic, then the alert may not have been triggered.

Some traditional IT-management systems try to overcome the inadequacy of applying Boolean Logic to thresholds by defining multiple thresholds for various levels of alert, such as "warning", "alarm", "critical" or other schemes of thresholds associated with different "severities". This only multiplies the underlying problem of a miniscule change triggering or not triggering an alert and a change of status of the monitored resource. It also increases the number of alert messages, which need to be processed, because the smaller the intervals among thresholds become, the more alerts will be triggered by fluctuations of the parameter value. The example in FIG. 4 has 18 threshold crossings on 9 thresholds, while there are only 2 threshold crossings in a 2-threshold scheme.

Monitoring the rate of change of a parameter value, and having a threshold defined for it, is also a way to soften the impact of the problem. When examining the leading products in the field, it has been found that only a few utilize the monitoring of the rate of change of a parameter.

Current IT management systems typically utilize one or two commonly known ways to inform IT management personnel about the current situation. In one method, one or more lists of messages are displayed on a console. The displayed messages may be colored-coded according to a scheme, which relates a specific color to each severity level of the message. In a second method the monitored resources are represented by a graphical object (typically an icon) on the console. The graphical objects may form a hierarchy, which visualizes the relation among the resources. The graphical objects may be color-coded based on a status derived from the worst severity message which has not been acknowledged by IT management personnel, or the status derived from threshold analysis or its upwards propagation in the hierarchy of resources.

Additionally a few products allow a "drill down" (typically using mouse clicks) to a graphical representation of raw parameter values via gauges, or various forms of graphs.

Fuzzy Logic and its Traditional Applications.

Boolean logic is a 2 state logic (FALSE, TRUE) with operations such as NOT, AND, OR, XOR. It has been known since the ancient Greek philosophers used it and it entered the digital age, when 'flip chip' modules were invented (pieces of hardware, which evaluated Boolean expressions) as predecessors to the digital computers. By assigning TRUE to "1" and FALSE to "0" a set of logical values became equivalent to a binary number.

Boolean logic is still the base of most digital computing, but when a human uses a computer to computes a mathematical function, no thought is given to what happens in each transistor of the computer. However, the tendency remains, when making decisions in programs, to fall back to a very low level and use Boolean logic to implement something very complex, such as reasoning.

The switch for a light bulb is still used as the classic example for Boolean logic. The switch is either OFF or ON and, consequently, the light bulb is OFF or ON. With multiple light bulbs and switches the Boolean operations of A AND B, A OR B, NOT A, and so on, can be nicely demonstrated.

The invention of the "dimmer" allows dimming the light to have a continuum of brightness between OFF and ON. The threshold concept could now be used to define that at a brightness of >80% the light is called ON and otherwise it is called OFF. The example appears to be an arbitrary selection. A threshold at 50% would work as well. This is exactly what currently is done in IT management. The definition of the thresholds is typically not a consequence of a precise calculation or a determination from necessary conditions, it is an arbitrary value within a range of values, which seem to be reasonable based on experience.

In the same way that a person would have difficulties to explain, why a brightness of below 80% should be considered to be OFF, an IT manager has difficulties explaining why a disk which is 69.99% full, is OK, while a disk, which is 70.01% full, is not-OK.

The concept of "fuzzy sets" has been known since about 1965. Since then, the theory grew into the concept of "fuzzy logic". Today fuzzy logic finds increasing acceptance in control circuits of industrial processes (e.g. concrete mixing), commuter trains (brakes in Tokyo subway) as well as in household appliances (vacuum cleaners, washing machines, heating systems, etc.).

Its main feature is that fuzzy logic allows making practical decisions in situations, which are either not analytically understood or far too complex for a complete analytical representation. It could also happen that the complete calculation-intensive analytical model offers no benefit over a simple fuzzy logic approach.

In traditional set theory the set membership is described by Boolean logic (A is a member of set X or not). The set membership in fuzzy set theory is derived from applying a "membership function", which, in normalized form, will return a value between zero and one. Thus, situations where human reasoning would conclude "rarely", "sometimes", "often" rather than "always" or "never" can be easily modeled. An easy to understand example of membership functions is the special case where the membership function returns a probability (normalized between zero and one). For example, Independence Day has a membership function value of about 1/7 for each day in the set of days-of-the-week.

It would therefore be advantageous to provide a method and apparatus to overcome the disadvantages of the threshold concept and Boolean logic based status processing and propagation.

SUMMARY OF THE INVENTION

The present invention overcomes the disadvantages of using thresholds and Boolean logic in IT-management and Business Service management by using fuzzy logic to process parameter values and propagate status information for monitored resources. This allows concepts found in human reasoning to be modeled into the processing of information used for decision support in IT-management and Business Service management.

Membership functions as defined in fuzzy set theory are used to derive, convey and visualize fuzzy sets for the status of single measured parameters as well as for status information of monitored resources. The status information of monitored resources can be based on multiple measured parameters and alerts from non-numerical observations, which are relevant for judging the status of the monitored resource. The status of single parameters and the status of monitored resources can be visualized in a way, which supports easy human perception using a graphical method known as a color cross-fading graphical object.

The disclosed method and apparatus can be used simultaneously with traditional display methods (like traffic light colors, graphs and event lists) and traditional automation of event processing. The invented method and apparatus can be made backwards compatible with traditional IT-management methods by choosing appropriate fuzzy set membership functions during configuration of the apparatus, which can "degenerate" to simple threshold processing and traditional Boolean reasoning on alerts (events).

DETAILED DESCRIPTION OF THE INVENTION

In the following detailed description, reference is made to the accompanying drawings, which show, by way of illustration, specific embodiments in which the disclosed subject matter may be practiced. However, it is to be understood that other embodiments will become apparent to those of ordinary skill in the art upon reading this disclosure. The following detailed description is, therefore, not to be construed in a limiting sense, as the scope of the present subject matter is defined by the claims.

This detailed description uses arbitrary examples of parameter values to explain the methods. The described methods can be used for any measured parameter value, or groups of parameter values comprising a higher level status, which represents some property of any component of an IT system, be it hardware or software. At higher levels, measured parameters, or groups of measured parameters, may be combined to form a single parameter related to properties of a business processes, which depends on the underlying monitored IT-system(s).

Applying Fuzzy Logic to a Single Parameter Value.

Note that the exemplars used herein to explain the methods or the invention are in no way meant to limit the scope of the invention to the parameters or methods discussed. A person of skill in the art will realize that the methods described can be used with any parameter for which a measurement can be obtained. Realistic examples would be the cache-hit rates of a database (e.g. dictionary cache, write cache of an Oracle engine), the transaction rate of an airline reservation system, the fragmentation of a file system, the rate of cancellations in an online store.

The easily understood concept of "temperature" as a parameter can be used to illustrate the disclosed method and apparatus. With increasing miniaturization and transistor density, the CPU temperature has become an issue even in PC systems. For the purpose of explaining the disclosed subject matter, we assume the CPU to be within a temperature range between 0° C. and 100° C.

Figure 8:
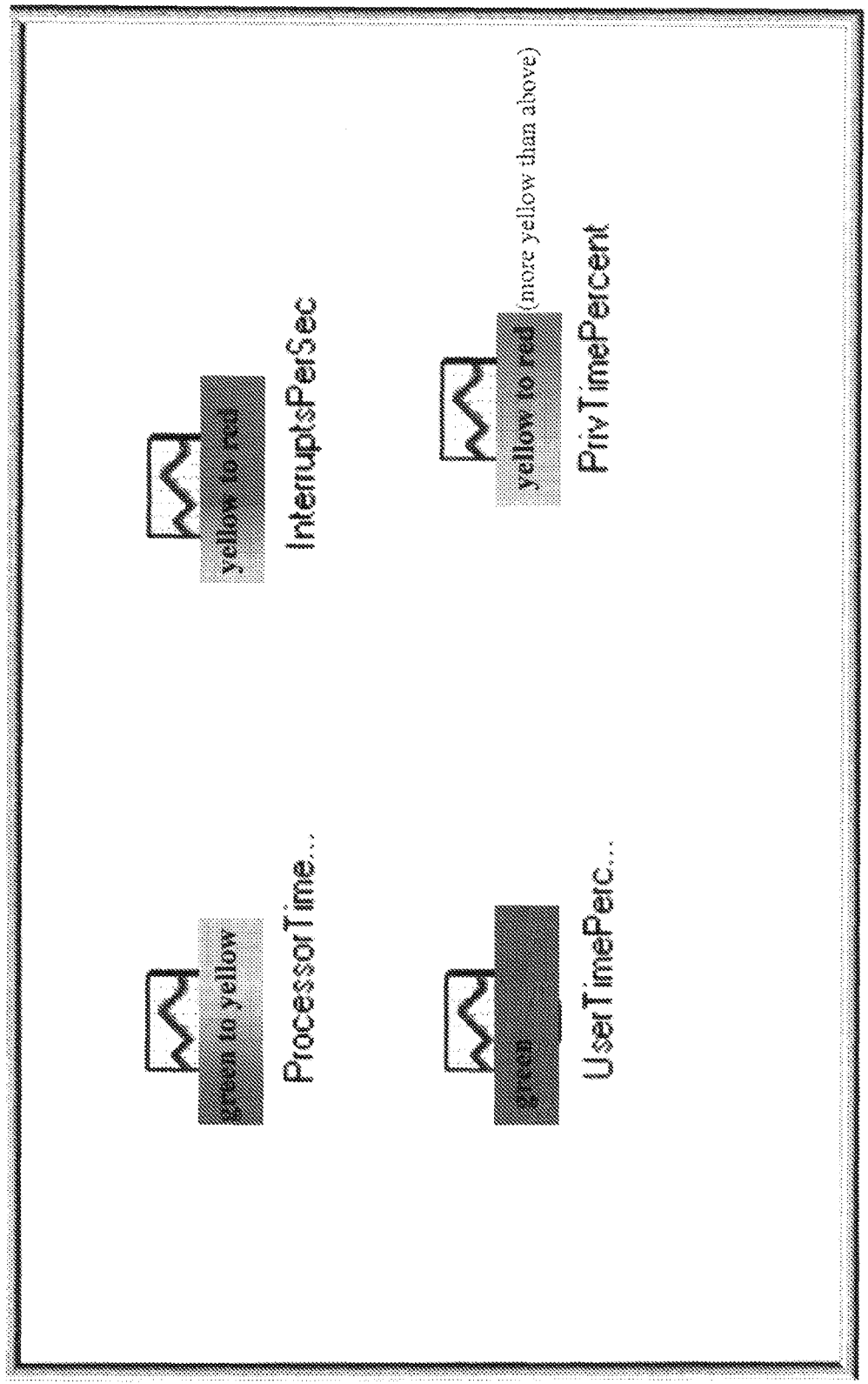
FIG. 8 is a depiction of a screen shot that displays parameters with cross-fading colors to provide quantitative information about metrics represented by labeled graph icons.

The preferred embodiment uses the colors green, yellow and red to visualize the status of a parameter value, and thereby the amount of attention it should get from a human operator looking at the management console. The preferred colors were chosen because of their almost universal meanings of green="OK", yellow="WARNING" and red="ALERT". Note however, that any colors could be used. Preferably, the colors are arranged into a color cross-fading graphical object, as shown in FIG. 8, which will be discussed in more detail later.

In a traditional Boolean logic based system, these colors could be used to indicate a sharp border between states, such as with a traffic light. Typically, only one light of the three lights in a traffic signal is lit at any one time, clearly indicating the state of the signal. If we were using thresholds and Boolean logic to use these colors to represent the CPU temperature parameter of an IT system, green might represent an acceptable temperature, yellow might represent a "warning" temperature range and "red" would indicate that the CPU may be seriously overheated.

Figure 1:
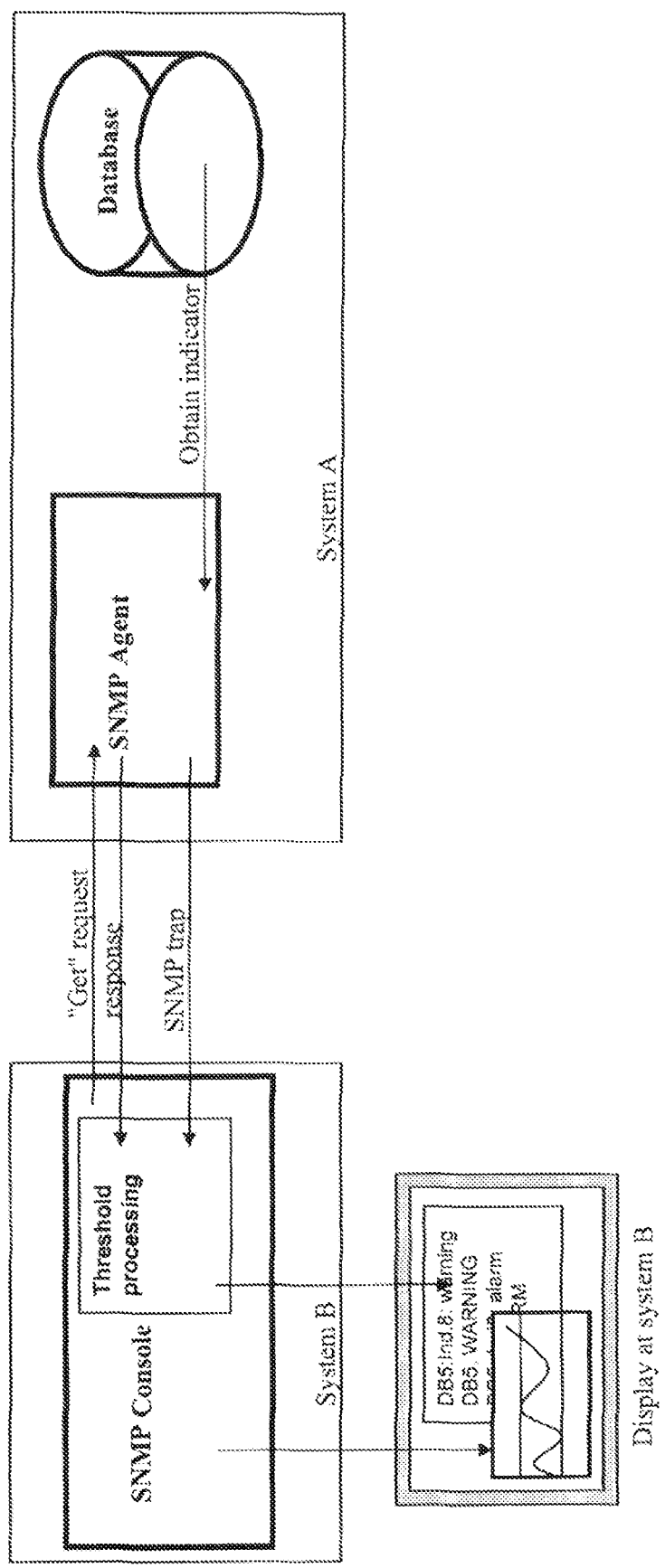
FIG. 1 is an example in the prior art of monitoring status and performance parameters of IT systems using the simple network management protocol and processing thresholds at the console or management server.
Figure 2:
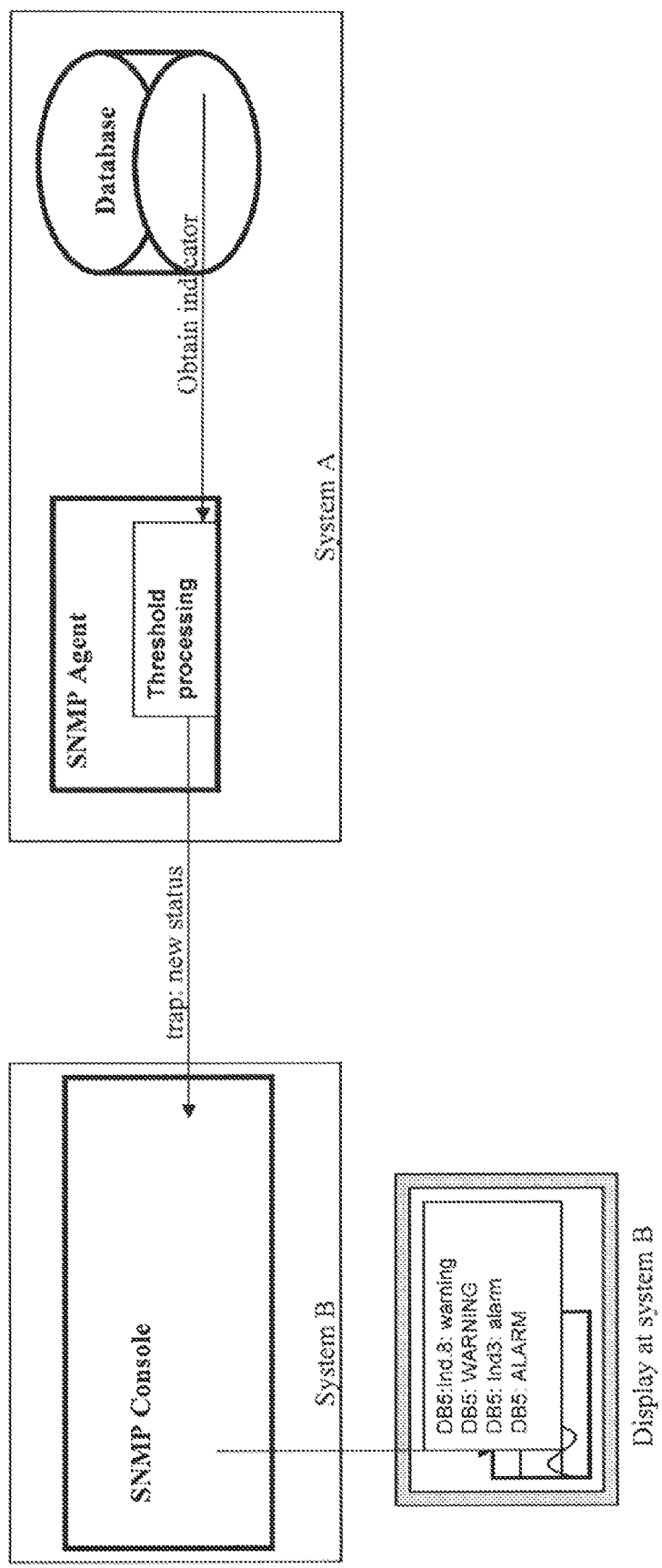
FIG. 2 is a second example in the prior art of monitoring status and performance parameters of IT systems using the simple network management protocol and processing thresholds inside the agent.
Figure 3:
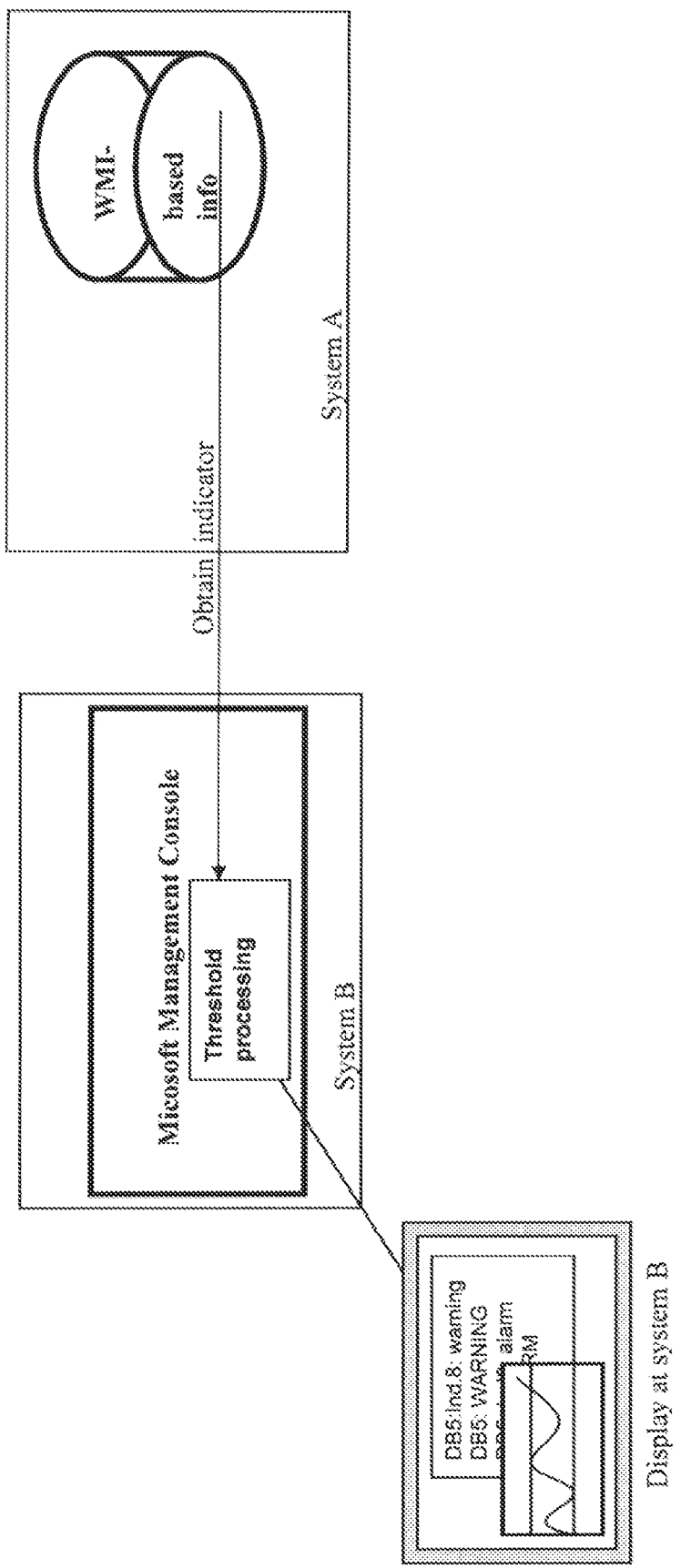
FIG. 3 is an example in the prior art of monitoring status and performance parameters of IT systems using Microsoft's WMI.
Figure 4:
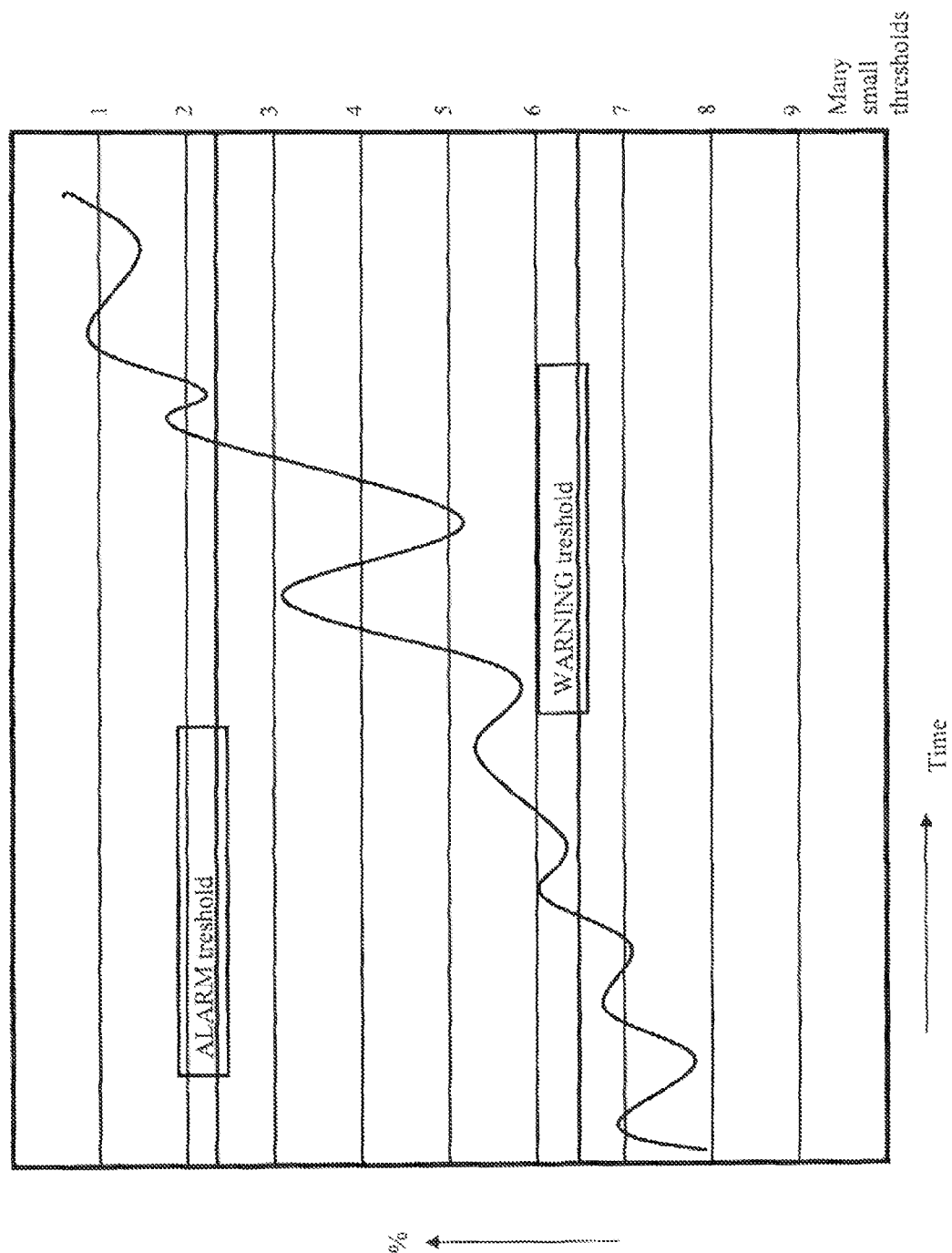
FIG. 4 shows the effect of parameter fluctuations on the number of threshold transitions, when the number of thresholds increases.
Figure 5:
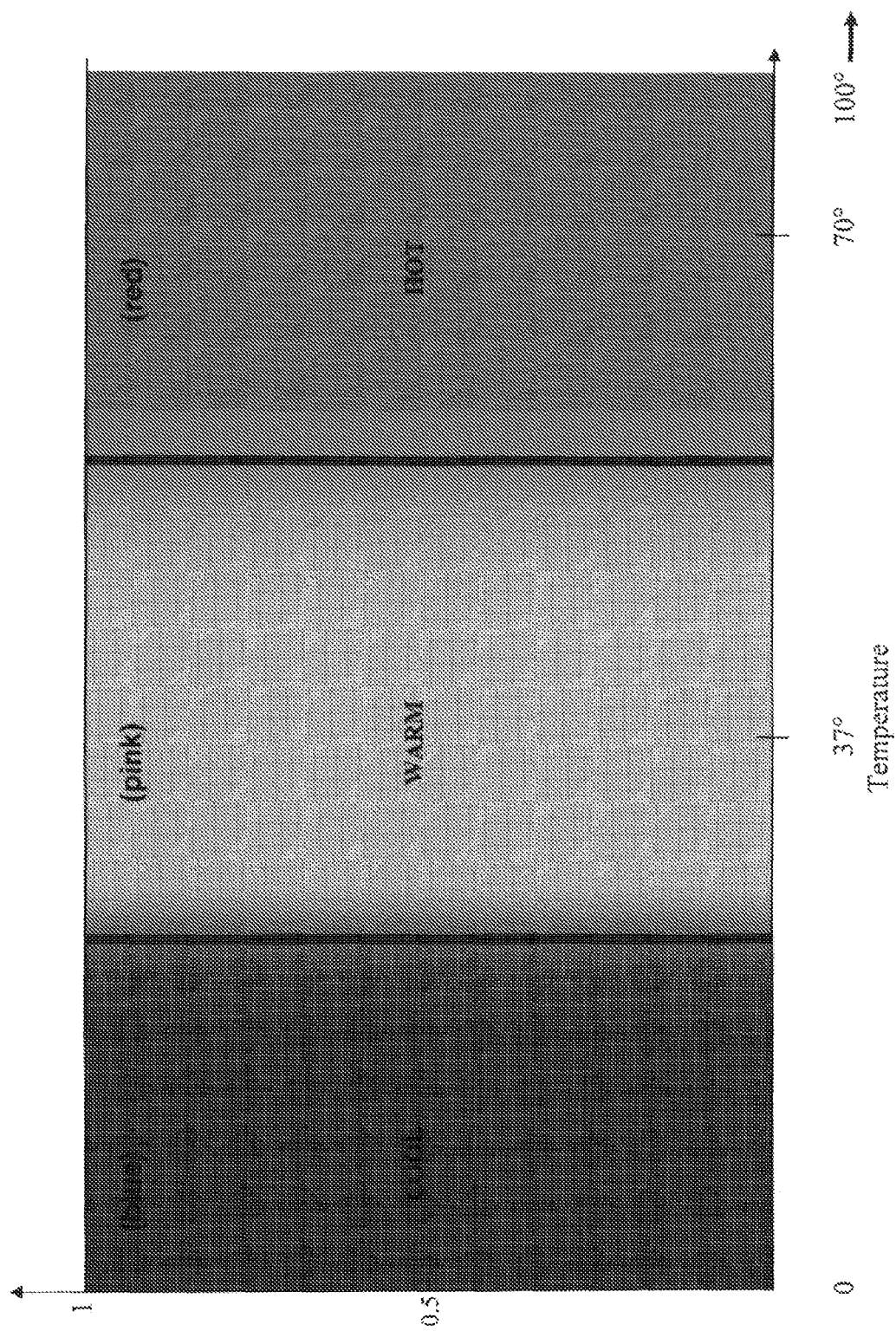
FIG. 5 is a normalized temperature graph in which temperatures are delineated as "cold," "warm," and "hot", color-coded by blue, pink and red with colors fading into each other around the vertical lines.

For convenience of explanation the thresholds are chosen to delineate the directly perceivable ranges of "cold", "warm" and "hot", as shown in FIG. 5.

Figure 6:
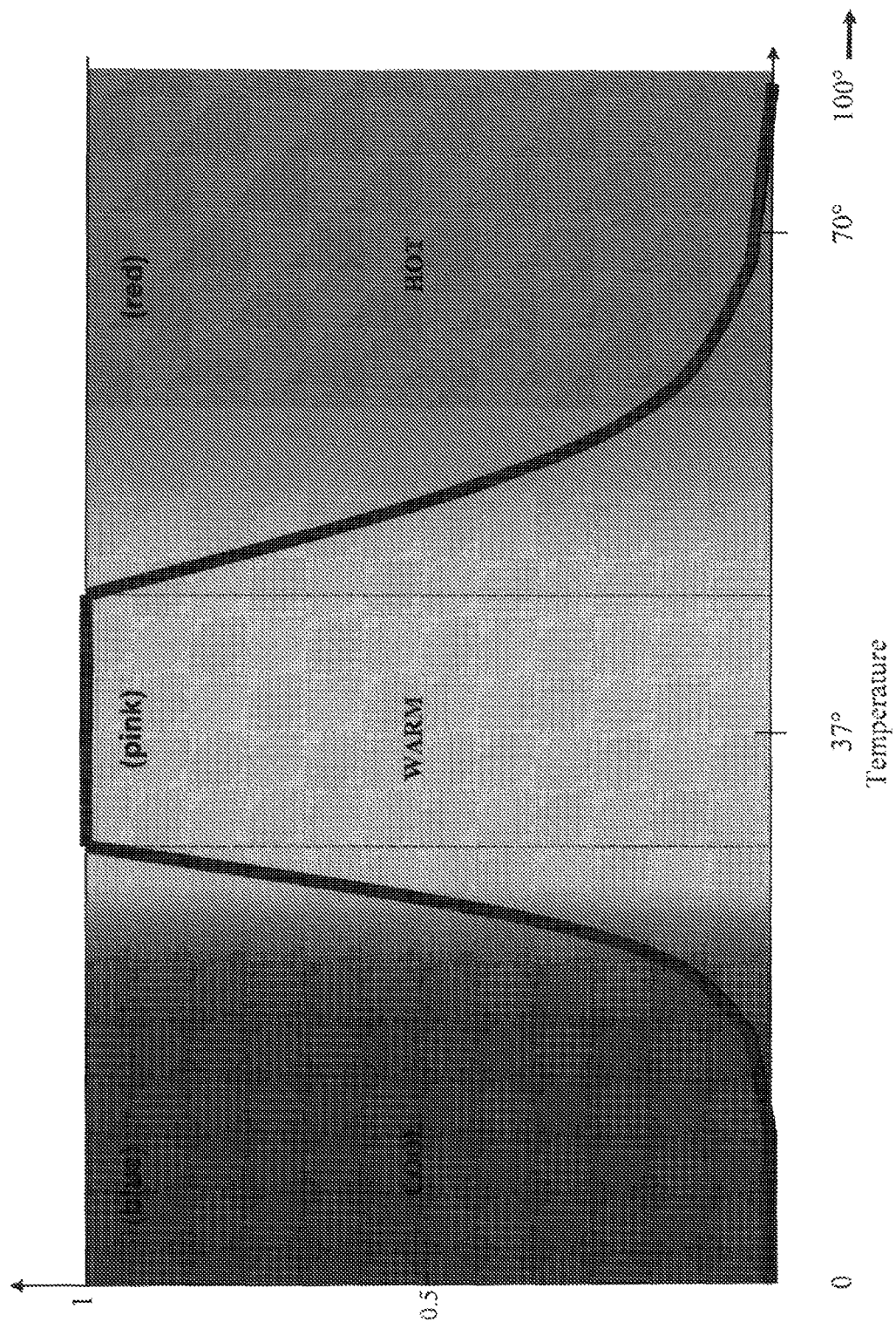
FIG. 6 is a graph of a membership function for "warm" for the normalized temperature graph of FIG. 5, where the color cross-fading illustrates the slope of the function and the fuzziness of the transitions.

Obviously two people may not agree on any precise value of the temperature ranges which can be identified as "cold", "warm" or "hot" or on the exact temperatures which delineate "cold" from "warm" or "warm" from "hot". They might agree that a value close to 0° C. is cold, values around the body temperature of 37° C. are "warm" and temperatures near 100° C. are "hot". The human sensory perception of relative temperatures would also allow to agree on temperature "A" being warmer or colder than temperature "B". This situation can be well described by defining fuzzy set membership functions for temperatures and their membership in fuzzy set ["cold", "warm", "hot"]. FIG. 6 depicts a membership function for "warm".

The clipped center range has a value of 1, which corresponds to a Boolean set membership in the set "warm". Along the slopes of the function, it matches the human perception of relative temperatures. By increasing the slope to infinity at both ends of the kernel (the range where its value is 1) the curve would degenerate to a rectangle with a sharp delineation towards "cold" and "hot". This shows that fuzzy logic based reasoning can approach Boolean reasoning by degenerating the shape of membership functions.

The terms "cold", "warm", "hot" or respectively "ok", "warning", "alarm" are now linguistic variables relating human reasoning to a mathematical base via the membership function. In spite of the "fuzzification", their meaning has now an objective base for agreement and disagreement.

Figure 7:
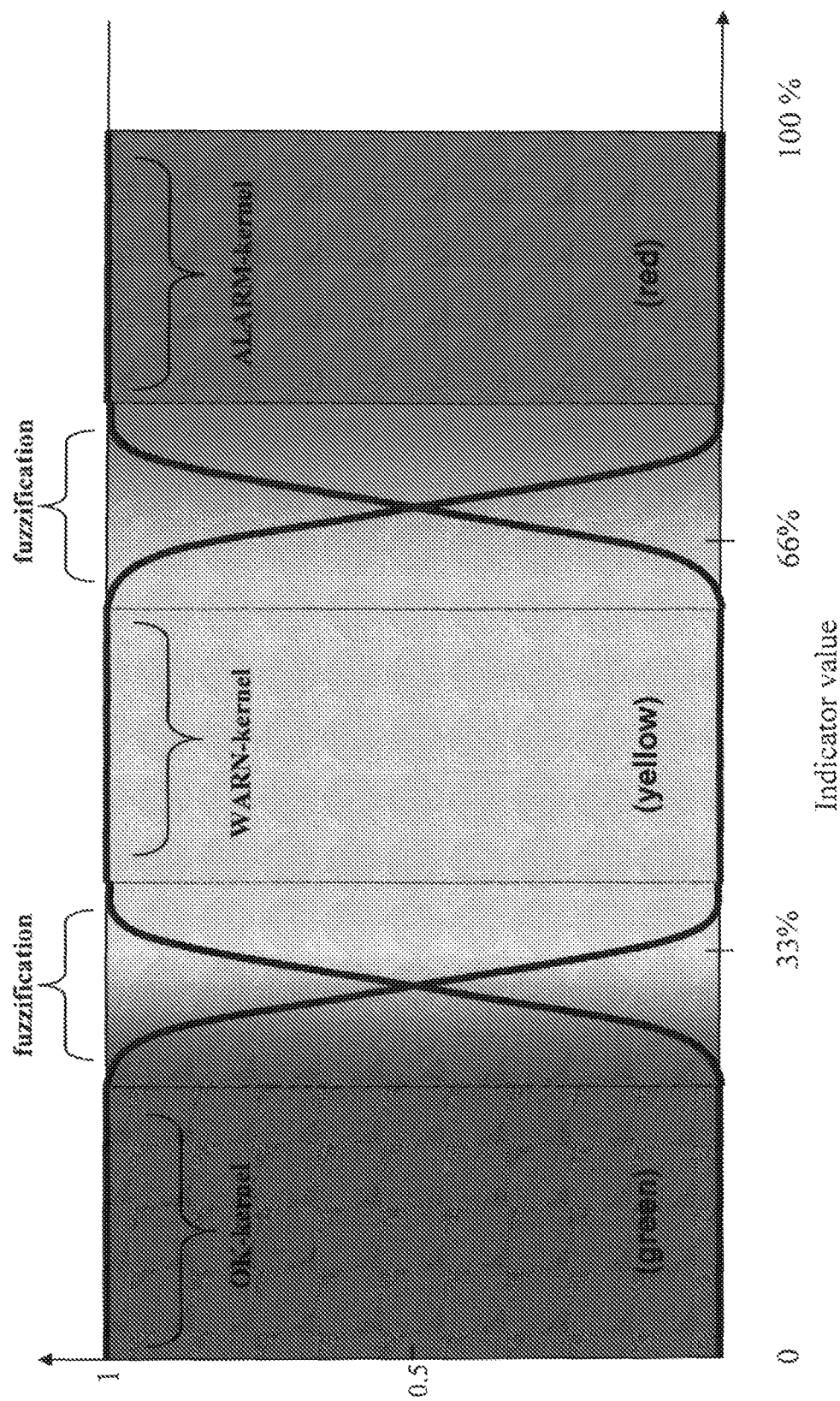
FIG. 7 shows the abstraction from temperature perception to membership functions for the status of a parameter expressed in a 3 tier model using the linguistic variables OK, WARN and ALARM and traffic light colors for visualization.

To define the status of a parameter, the membership functions for "ok", "warning" and "alarm" are defined in such a way that the sum of their values at any value of the parameter is 1, as shown in FIG. 7. Thus, the status of a parameter is defined by 3 values, each between 0 and 1. Their normalization to a sum of 1 is used to transfer only 2 values between the location evaluating the measurement and the location displaying the status, (console) or the location of reasoning about potential automated reactions (management server), because the $3^{rd}$ value can be derived.

The status of the parameter is visualized at the Console by displaying a color cross-fading graphical object whose simultaneously present multiple colors show more or less presence depending on the value of the membership functions. It is obvious that parameter values inside the kernel of a membership function will produce a single color, such as in a traditional console display.

When the parameter value moves into a fuzzification zone, a second (or even third) color becomes simultaneously visible as part of the color cross-fading graphical object, whereby each color contribution to the display is proportional to its membership function value.

In the preferred embodiment, the membership functions are defined such that at any given value of the parameter, only two of the three functions deliver a non-zero value, as in FIG. 7. Thus only two neighboring colors can be present at one time in the color cross-fading graphical object. For the actual drawing of the color cross-fading, the preferred embodiment would use a color transition algorithm provided by the underlying rendering software or hardware, as shown in FIG. 8, which shows a console window example. In embodiments allowing three non-zero membership function values for a single sample of the parameter value, either two adjacent transition zones need to be used for color cross-fading, or a more complex simulation can be used, which uses distribution functions for the light frequencies presented to have a rainbow-like appearance (convoluted color spectrum). Drawing an array of monochromatic narrow stripes from a repertoire of transition colors is a method, which does not require much compute power. Note that this method could be used to display any number of non-zero membership function values.

In display systems with a limited color repertoire, the technique known as dithering will achieve a sufficient approximation of cross-fading.

Figure 9:
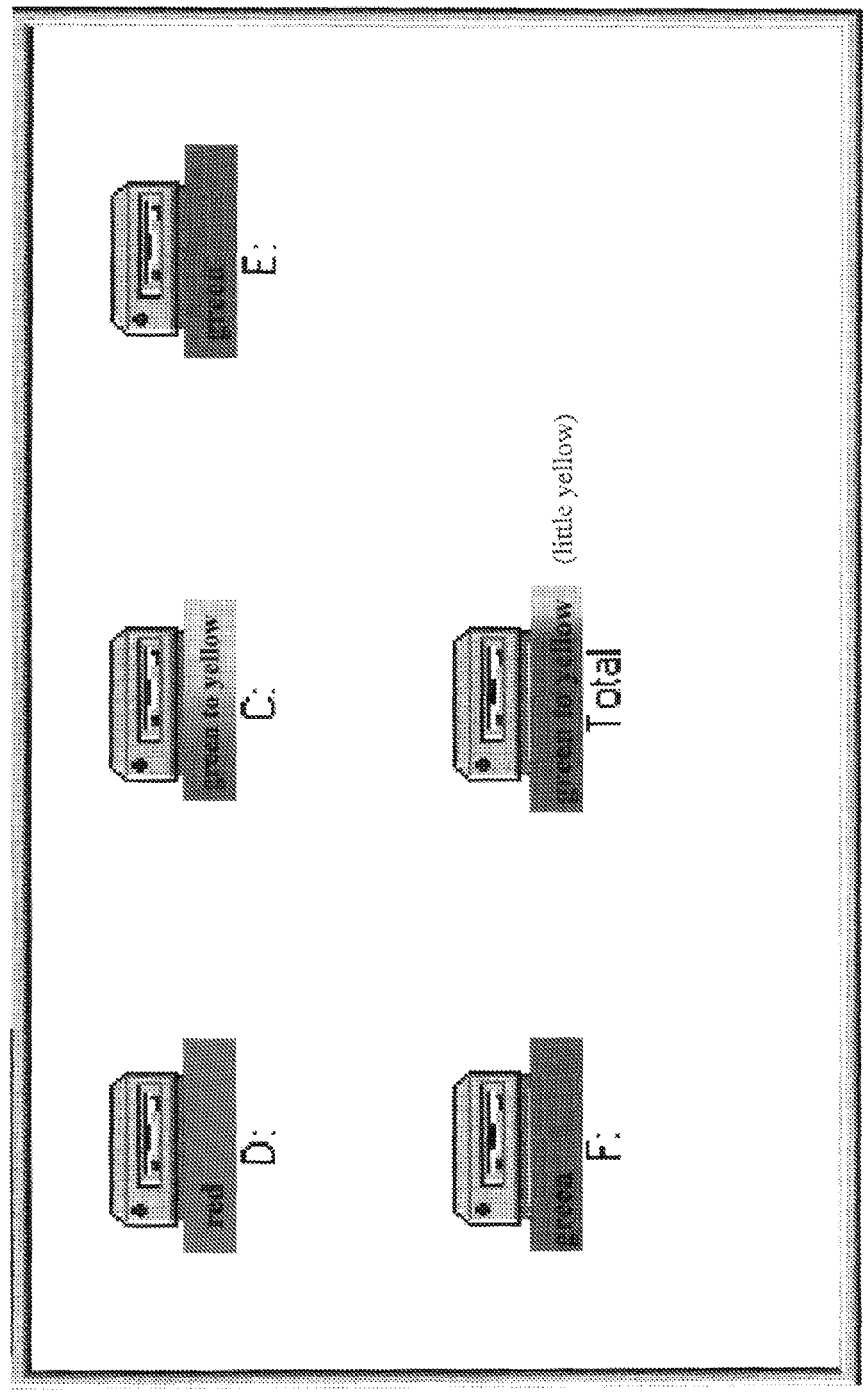
FIG. 9 is a depiction of a second screen shot displaying parameters with cross-fading colors to provide information about the health of storage devices of IT system.

In the preferred embodiment, the color cross-fading graphical object will be presented as a small surface attached to a graphical icon, which represents the monitored resource or the monitored parameter on the screen. This is shown in FIGS. 8 and 9. In other embodiments, any graphical representation relating the color cross-fading graphical object to the monitored resource may be used. One alternative is to represent the monitored resources or parameters by facetted icons, where one of the facets will display the color cross-fading graphical object. Another alternative is to color the whole icon or graphical object representing the managed resource or parameter with the appropriate colors using a technique known as texture mapping.

A display as used in the preferred embodiment is a raster display with virtual windows and window panes as typically found on PCs running Linux or MS-Windows. To a person skilled in the art it is obvious that a display can also be any form of display technology in software and hardware, which is capable to provide information in a form visually perceivable by humans.

In the preferred embodiment, rule processing may be used to achieve automation. Due to the quantitative nature of the status information, this method allows a quantified reaction based on the known membership functions. An example is the recovery action for a file system, which could automatically move old files according to an archiving policy, but only the amount necessary to keep the occupancy parameter value within the kernel of the OK membership function.

Learning Based on History of Measurements.

As is known in the prior art, the process of defining reasonable thresholds can be assisted by statistical analysis of measurement history. Typically, thresholds were defined at 2σ (double variance of the distribution function) during 'regular' operation times to define a corridor for 'normal' values of a parameter.

Using the methods of the present invention, however, instead of exporting just the variance, the whole distribution function can be exported and renormalized to serve as membership function for the "ok" status. The complementary distribution (1−μOK(x)) can be split at a 3σ range ("confidence interval") into μWARN(x) and μALARM(x) membership functions. If deviation from the "normalcy" corridor is only not "ok" in one direction (some resources are "ok", when they are underutilized), the other direction can become part of the kernel area for OK.

Applying Fuzzy Logic to an Instance of a Monitored or Managed Resource

Figure 10:
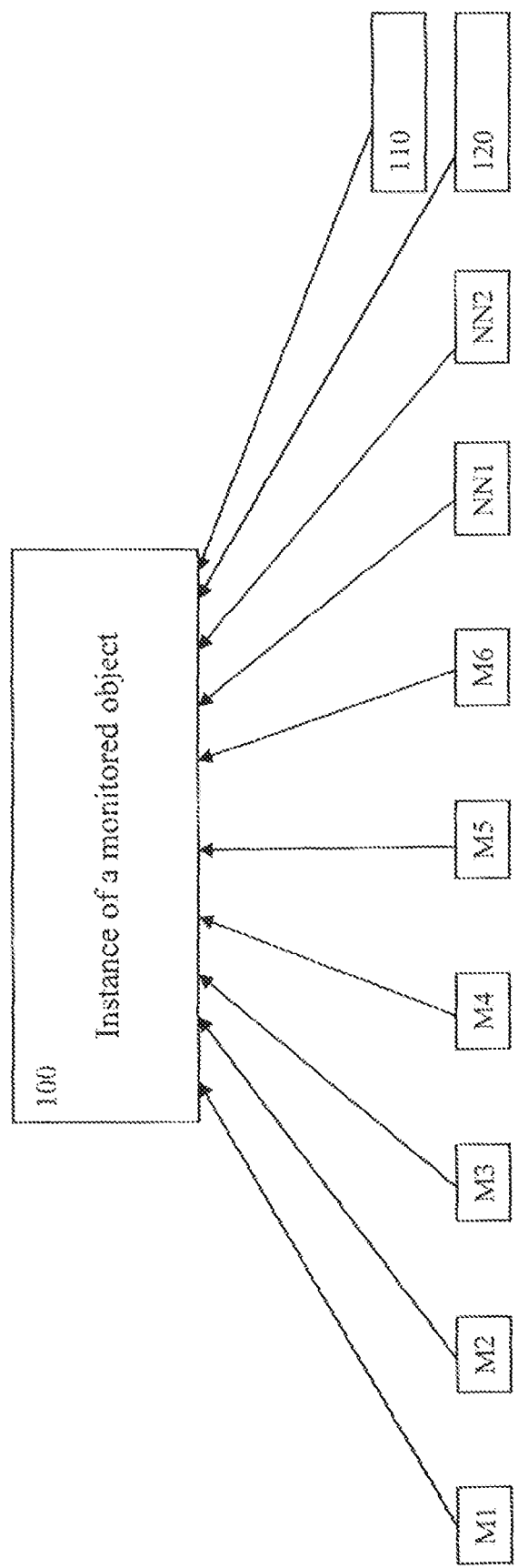
FIG. 10 shows an instance of a monitored resource being dependent on a plurality of monitored metrics, non-numeric attributes and other monitored resources.

The status of a monitored resource can be derived from the status of multiple metrics, which contribute to the status of the monitored resource in some fashion. It may also depend on non-numeric information and even the status of other monitored and managed resources. This is shown in FIG. 10, wherein the status of monitored resource 100 is dependent upon the status of metrics M1 through M6, which are single parameter values as described above, each of which also has a status. Note that the number of single parameter value shown in the figure is only used as an example; any status of a monitored resource may depend on the status of any number of single parameter values. The status of single parameter values M1 through M6 can be based on fuzzy logic or can be simple Boolean parameters. Likewise, the status of an instance of a monitored resource can also be dependent upon non-numeric information depicted as NN1 and NN2 or the status of other monitored resources, depicted as objects 110 and 120 in FIG. 10.

In addition, monitored resources may have multiple statuses based on different sets of dependencies. For example, for a single monitored resource we could derive a "health status" and a "performance status", each from a different, but potentially overlapping set of metrics.

Instance Level Single Status Model

In traditional systems the status of an instance is derived from Boolean set operations such as the worst status in the union of all status sets [ok, warning, alarm, critical, . . . ], where the status parameters are derived from parameter values and observed non-numeric properties. The status derived from non-numeric properties is referred to as "discovery state". An example of "discovery state" is where files of an application are all present or one or more are missing and, as a result, the application is running or limited to a subset of functionality or unable to run at all.

In the preferred embodiment the status of an instance is calculated by a fuzzy set operation, which is a generalization of the union operation of crisp sets of traditional set theory.

Instead of using the simplest generalization of a union of sets, $(C = A \cup B \Leftrightarrow \mu C(x) = \max(\mu A(x), \mu B(x))$ in the preferred embodiment, specific cases of monitored resources may be best described by using T-norms and Co-T-norms as set operations for calculating the instance status.

As in traditional products it has to be possible to include discovery status information into deriving the status of an instance. As most simple solutions in the preferred embodiment crisp sets of discovery status information are included into the fuzzy set operation. In some types of union operations this will degenerate the result to a Boolean status.

This is acceptable for cases like a hard crash of a software application, but for other observations, the concept of linguistic variables should be applied to convert the observation to a fuzzy status. As an example, some applications run multiple processes. The failure of a single process traditionally leads to an alarm, although the application can continue to run and the process can be restarted. In such a case the number of still available processes can be used to derive a fuzzy status. An automaton can then decide to fix the problem based on fuzzy status information without causing an alert message.

After the instance status has been calculated, it can be visualized at the console as a color cross-fading graphical object, as described above with respect to single parameter value metrics, as shown in FIG. 9.

Instance Level Multiple Status Model

Instead of calculating and displaying a single overall status, which is a triplet of membership function values, multiple statuses can be calculated and displayed.

The group of statuses can contain one or more of the following types:
  a) Boolean derived status (type Boolean value), for compatibility with traditional status model;
  b) intelligently derived status (type fuzzy set) which is derived from a generalized set operation to the membership function values of weighted parameter values;
  c) automaton status, a fuzzy set which tells if the resource is being successfully controlled using the automation features of the system
  d) discovery status (type fuzzy set) derived from non-numeric attributes, typically observed during repetitive automated discovery of the resource;
  e) human advice status, a fuzzy set which is present, if the automaton has access to an analysis and prediction facility and has found that a problem can be anticipated or a human initiated change could improve the situation.

Other types of statuses can be conceived by those of skill in the art, and the present invention is not meant to be limited to those types of statuses enumerated above.

For an adequate visual representation of multiple statuses there are several choices. In the preferred embodiment, a status icon may allow an additional level or multiple levels of drill down to show multiple status icons per instance. Alternatively, the additional status icons can be shown on the parameter level using the instance icon again, or the instance icon could be split into multiple surface facets.

Applying Fuzzy Logic to a Class of Monitored or Managed Resources

Figure 11:
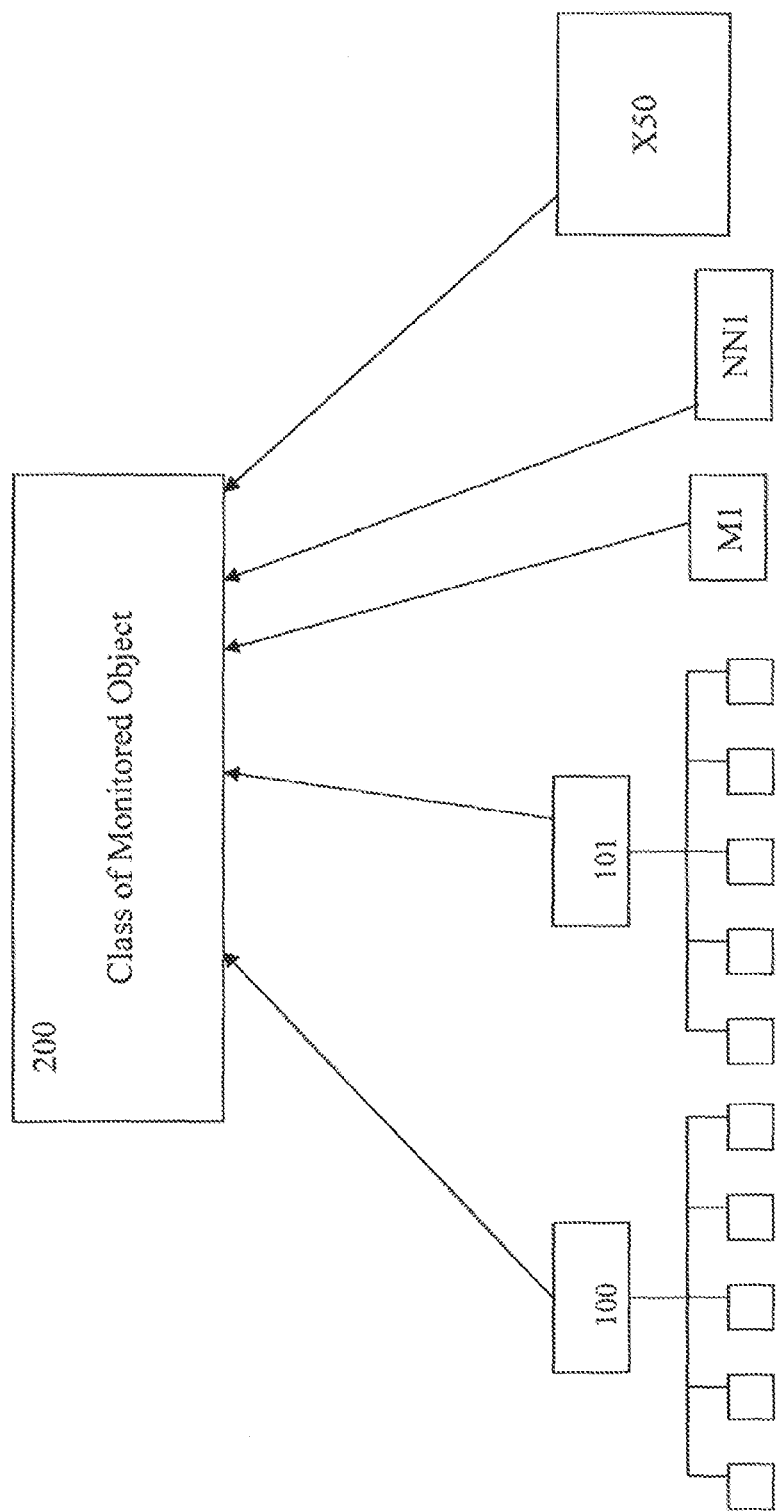
FIG. 11 shows a class object being dependent upon the status of instances of monitored resources (100, 101), additional class level attributes (M1, NN1) and another class or instance of another class (X50)

The status of a class of monitored resources can be tracked by creating an abstract "class object", which represents a class of monitored resources. An example would be the presence of multiple database instances of the same type of database product (e.g. Oracle) on an IT system. The status of the class object (e.g. for class Oracle) may be derived from the status of one or more monitored instances of this class (resources of the same type) and may also require input from monitoring common class attributes (class level metrics or non numerical information). It may even depend on other monitored resources of different types. This is shown in FIG. 11, wherein the status of class object 200 depends on its 2 instances 100 and 101, but also on class level attributes M1 and NN1 as well as another object X50, which may be an instance of another class of managed resources or the class object of another class.

Class Level Single Status Model

The traditional way of applying the Boolean worst status rule is not a problem, when all resource instances can be judged similarly (e.g. they are all production databases). However, when some of the instances serve a very different purpose they may need to be judged differently (e.g. some databases are test-beds). This will certainly affect the normalcy of their parameters, but it must also be considered, when judging the overall status of a class of resources.

A Boolean set membership has no way to quantify the importance of the instance. In the disclosed method and apparatus, a simple quality factor or even a quality function is introduced to determine the contribution of each specific instance to the status of the class object. As an example, a test bed database may not be important at all, but if it consumes resources on the same mainframe as the production version of the database or uses network bandwidth also used by production systems, then its status should not be completely ignored. Using a quality function before the set operation, which folds it into the class status can ensure that there is no overreaction to an issue with the test bed. In FIG. 9, the summarized status of all disks only shows a small amount of yellow, in spite of disk D: being in red kernel.

Better than a global quality function alone is the application of quality functions to each parameter within the instance, depending on the relation of the parameter to the possibility to affect global resources on the IT systems. Class level multiple status model.

A multiple status model on the instance level would provide several degrees of freedom to judge the status of a class. For example the same status attributes as on the instance level may be reused on the class level and each instance status attribute is folded with a fuzzy logic operation into the corresponding class attribute using quality functions as discussed above. Additionally or alternatively, the instance level status attributes can be used to calculate a class level "attention" status to trigger human attention to that class (e.g. for an operator class such as "Database Administrator"). Further, an additional "class resources" status can be derived from a class level discovery procedure, which determines the presence and potential damage at class level resources (shared by instances).

Applying Fuzzy Logic to Business Processes or Business Services Support Based on Information Technology (IT)

Figure 12:
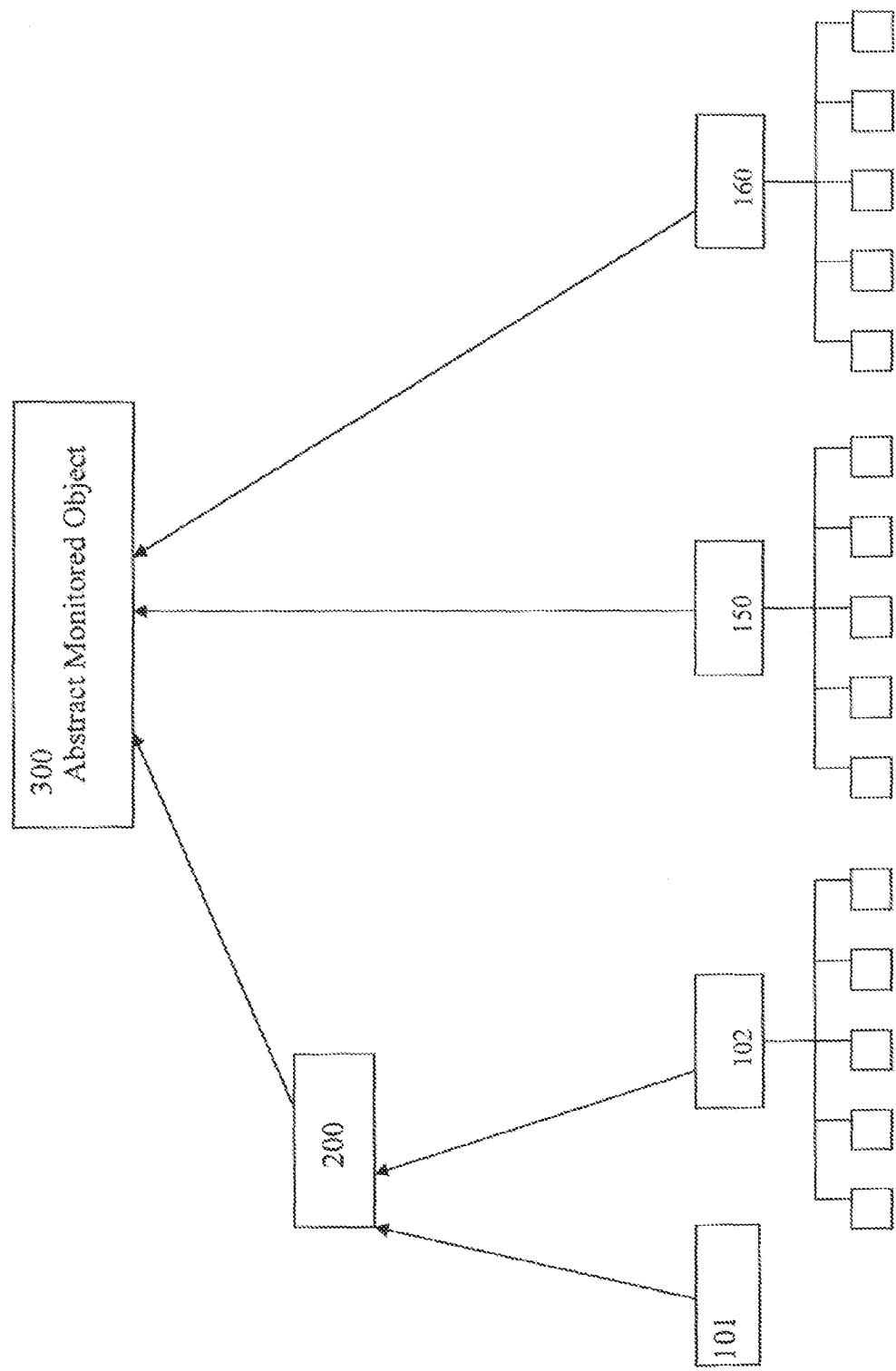
FIG. 12 shows an instance of an abstract monitored resource (e.g. a business process), which is dependent upon instances of other monitored resources and other classes of resources.

The status of a business process depending on IT and the status of business services provided using IT can be determined by defining an abstract resource, which represents the business process or business service (PB/BS). In the same way as fuzzy status propagation was used to determine the status of instances and the status of classes of managed IT resources, it can be used to derive the status of a BP/BS. This is shown in FIG. 12, where the status of object 300 representing an abstract monitored resource, which could represent a business process or service, depends on the class of resources 200, which has 2 instances 101 and 102, and the instances 150 and 160, which may be managed resources (instances) belonging to other classes. An example would be a business process requiring 2 database instances of a certain database product as well as an ERP application and a web server.

All relation types presented in FIGS. 10, 11 and 12 may be cascaded to form a complete picture of a complex business process containing any number of and many types of managed resources. The resulting graph determines the paths for propagating status information upwards as discussed for instance and class level status propagation.

Different paths along the dependency graph of a BP/BS may be of different importance. This was discussed at the class level using a test bed instance and a production instance of a class database as an example. In the same way quality factors and quality functions may be applied in calculating a single status or multiple status attributes of a BP/BS.

Taxonomy Aspects of the Disclosed Method and Apparatus

If status values are recalculated at every single new measurement (in intelligent agents) or query (in managements servers) of a parameter value, then the disclosed method and apparatus would require more compute power than traditional systems based on threshold processing and Boolean status.

While threshold comparisons and Boolean operations at best can be done in a single processor instruction, the calculation of membership values requires multiple instructions.

To attract human attention the speed of making any change of situation visible at a display console is not as essential as displaying the complete context created by a change in one or more parameters. Thus it is actually beneficial to batch the processing of parameter values within an interval of a settable number of seconds, which is short with respect to human reaction time, but very long in relation to current processor capabilities.

To avoid unnecessary processing for the instance level and above, a "modified"-flag and a "tolerance interval" are used in the data structure type for parameter attributes, so only significantly changed values need to be processed.

If an inverse function is available for the contribution of a membership function of a parameter for processing instance status, it may be faster to undo the contribution of a previous parameter value and redo the contribution with the new parameter value, rather than recalculating the status based on all involved parameters. An embodiment can allow configuring the calculation strategy.

In a "distributed systems" situation a change of status may need to be propagated across one or more systems. As an example, an intelligent agent may calculate the status for parameters and the local instance, whereas the calculation of the class status may happen at a management server. A change of status at the management server may require a message to the GUI console.

In traditional systems status changes are propagated by event messages. Most products only produce event messages on threshold violations or when discovery procedures found a change expressed by non-numeric information. It is also known in the prior art to generate events on "new data", which means every time a new parameter value has been measured (this allows real time graphing in the GUI).

If an embodiment of the disclosed method and apparatus uses intelligent agents, the agent batches the forwarding of status changes to the same interval, which is used for status calculation of instances. This way the resulting traffic is limited to a message per one or more seconds, which is not an issue at currently available networking speeds.

If an embodiment uses a management server polling the agents, as in the case of SNMP agents to obtain parameter values, the polling of parameter values should be done in intervals aligned with the batch interval for status calculations.

Coupling the Disclosed Method and Apparatus with an Incident Management System.

When an embodiment of the disclosed method and apparatus needs to be coupled with a traditional incident management system, it needs to generate incident records in a format, which can be understood by an adapter of the incident management system.

One method for this kind of coupling is to use the fuzzification only for display purposes, using a color cross-fading graphical object, and to use the kernel borders of the membership functions as threshold equivalents. This means an incident message will be sent when the status or one of the multiple status attributes changes its value into or out of the kernel zone of a membership function. When three linguistic variables are used (i.e., "OK", "WARNING" and "ALARM"), then this would effectively create a four threshold system (out of OK kernel, into WARNING kernel, out of WARNING kernel, into ALARM kernel). A filter passing only "into . . . " messages would reduce it to a two threshold system equivalent to the traditional WARNING and ALARM thresholds. As far as the incident management system is concerned, the nature and the benefits of the disclosed method and apparatus become invisible. It will be seen like any other source of incident messages.

Another method is to couple both systems through a rule engine, which can be configured to send incident messages on significant status changes. A "significant status change" means that the membership function value changes more than a configurable interval. To capture slow changes and changes in a self-adapting normalcy scheme this mechanism requires keeping history or at least the last value at which an incident message was sent.

By configuring small intervals (e.g. 0.1 of the normalized 0 to 1 total range of function values) drifts in the parameter value become easily visible as a chain of incidents. This allows incident or event correlation systems to discover a problem, before a traditional threshold transition would occur.

Both methods can be combined. This is recommended during a learning phase in the transition from purely threshold-based management to fuzzy logic based management.

Coupling the Disclosed Method and Apparatus with ITIL-Compliant Management.

Information Technology Infrastructure Library (ITIL) incident records are a standardized form of event records, so both methods discussed above can be applied.

The disclosed method and apparatus can also be coupled with a helpdesk in such a way that sets of color cross-fading graphical objects are selected to be associated and simultaneously displayed with a helpdesk incident. This allows the helpdesk personnel to be aware of the status of managed resources by simply seeing a simple to understand color graphical display, rather than having to read many messages.

An additional form of coupling is to have a fuzzy logic engine, which will automatically close or lower the severity of incidents and helpdesk cases, when the related managed resources become "dominantly" green. This requires defining a fuzzy relation among the incident records and the statuses of associated managed resources.

While the disclosed subject matter has been described with respect to a limited number of embodiments, those skilled in the art will appreciate numerous modifications and variations therefrom. It is intended that the appended claims cover all such modifications and variations that fall within the true spirit and scope of the disclosure.

I claim:

1. A system comprising a computer having software installed and running on said computer for implementing a process for determining and visualizing the status of a parameter measured at a monitored resource of a business process or it's computing resources, said software performing the steps of:
   defining said status as a fuzzy set with enumerated members, said members allowing an intuitive judgment of said parameter value;
   defining a membership function for each member of said fuzzy set, said membership functions being used to calculate the membership value of each enumerated member in the fuzzy set status;
   calculating the values of said membership functions from said parameter value;
   assigning a color to each of said enumerated members of said set; and
   displaying a color cross-fading graphical object, such that the amount of each of said assigned colors visible in said graphical object is directly related to said calculated membership value of each member of said set.

2. The system of claim 1 wherein said step of calculating membership functions occurs at or near the time when a change of a parameter value is observed at the resource.

3. The system of claim 1 further comprising the step of storing or transmitting said calculated membership values for further processing, such as status propagation or incident generation.

4. The system of claim 1 wherein the sum of said values of all of said all membership functions of said set is normalized to one.

5. The system of claim 1, wherein said color cross-fading graphical object uses color transition techniques to display said transitions between colors assigned to each member of said fuzzy set.

6. The system of claim 1 wherein said color cross-fading graphical object is displayed in a location selected from the group consisting of: (a) in close proximity to a graphical icon representing said monitored resource; (b) adjacent to an icon representing said monitored resource; (c) as part of an icon representing said monitored resource; and (d) as the coloring of an icon or a portion of an icon representing said monitored resource.

7. The system of claim 1 further comprising the steps of:
   defining the status of a monitored resource as a second fuzzy set whose members are selected from the group consisting of the status of one or more single parameter values, non-numerical parameters and the status of one or more other monitored resources;
   defining a membership function for each member of said second fuzzy set;
   calculating the value of said membership functions from said values of said status of said one or more single parameter values;
   assigning a color to each of said enumerated members of said second fuzzy set; and
   displaying a color cross-fading graphical object, such that the amount of each of said assigned colors visible in said graphical object is directly related to said calculated membership value of each member of said set.

8. The system of claim 7 wherein said monitored resource represents a class of monitored resources of the same type.

9. The system of claim 7 further comprising the step of using T-Norms and Co-T-Norms as set operations for combining the values of said membership functions to determine said status of said monitored resource.

10. A method and apparatus of determining the status of a monitored resource of a computing system, comprising software, running on said computer system for implementing a process performing the steps of:
    defining said status as a fuzzy set whose members are selected from a group consisting of the status of one or more single parameter values, the status of one or more other monitored resources and the status of one or more other monitored resources representing a class of monitored resources;
    defining a membership function for each member of said fuzzy set, said membership functions being used to calculate the membership of each enumerated member said status set;
    calculating the value of said membership functions from the values of said status of each of said members of said fuzzy set;
    assigning a color to each of said enumerated members of said set; and
    displaying a color cross-fading graphical object, such that the amount of each of said assigned colors visible in said graphical object is directly related to said calculated membership value of each member of said set.

11. The method of claim 10 further comprising the step of using T-Norms and Co-T-Norms as set operations for combining the values of said membership functions to determine said status of said monitored resource.

12. The method of claim 10 wherein said color cross-fading graphical object is displayed in a location selected from the group consisting of (a) in close proximity to a graphical icon representing said monitored resource; (b) adjacent to an icon representing said monitored resource; (c) as part of an icon representing said monitored resource; and (d) as the coloring of an icon or a portion of an icon representing said monitored resource.

13. The method of claim 10 further comprising the steps of:
    defining thresholds aligned with the borders of the kernel of said membership functions defined for each member of said status set; and
    generating an incident message when an obtained status of one or more of said members results in an evaluation of a membership function, the result of which has entered or left the membership function kernel.

14. The method of claim 13, further comprising the step of using a filter to determine the subset of incident messages which get generated.

15. The method of claim 10 further comprising the step of sending said message to an incident management system.

16. The method of claim 15 further comprising the step of using a filter to determine the subset of incident messages which are sent to one or multiple incident management systems.

17. The method of claim 10 further comprising the steps of
defining one or more thresholds for the calculated values of said membership functions; and
generating an incident message when the result of evaluating a membership function crosses one of said thresholds.

18. The method of claim 17 further comprising the step of using a filter to determine the subset of incident messages which get generated.

19. The method of claim 17 further comprising the step of sending said message to an incident management system.

20. The method of claim 19 further comprising the step of using a filter to determine the subset of incident messages which are sent to one or more incident management systems.

21. A method of fuzzy status propagation from one or more parameter status values to an instance of a monitored resource comprising a computer running software for performing the steps of:
defining a fuzzy status set having said parameter status values as members, said members also being fuzzy sets;
defining a fuzzy set union operation which creates membership values for each member of said instance of said monitored resource;
calculating a new status for said instance of said monitored resource upon the occurrence of one or more events, said events being selected from a group consisting of: (a) one or more of said parameter status values having been freshly obtained, (b) one or more of said parameter status values having changed more than a required minimum and (c) the expiration of an interval timer from the previous calculation;
assigning a color to each of said enumerated members of said set; and
displaying a color cross-fading graphical object, such that the amount of each of said assigned colors visible in said graphical object is directly related to said calculated membership value of each member of said set.

22. The method of claim 21 wherein said union operation is normalized to yield results such that the sum of all membership values in said resulting status set is normalized to one.

23. A method of fuzzy status propagation upwards in a hierarchy of resources of a computing system, each of said resources having one or more fuzzy statuses, comprising software running on said computing system for performing the steps of:
defining or selecting a fuzzy set union operation for each of said resources which creates membership values for each fuzzy status member of said resources;
deriving the fuzzy status of a resource upon the occurrence of one or more events, said events being selected from a group consisting of (a) one or more of the attributes of said resource was re-evaluated, (b) one or more of the attributes of said resource has changed more than a required minimum and (c) an interval timer based on the last calculation has expired;
assigning a color to each of said enumerated members of said set; and
displaying a color cross-fading graphical object, such that the amount of each of said assigned colors visible in said graphical object is directly related to said calculated membership value of each member of said set.

24. The method of claim 23 wherein said union operation is normalized to yield result values in said resulting status set is normalized to one.

* * * * *